United States Patent [19]

Noel

[11] 4,334,665
[45] Jun. 15, 1982

[54] REPLACEABLE CUP FOR ENGLISH MUFFIN PROOFING TRAYS

[76] Inventor: Eugene M. Noel, 1215 S. Portofino Dr., #106, Siesta Key, Sarasota, Fla. 33581

[21] Appl. No.: 140,824
[22] Filed: Apr. 16, 1980
[51] Int. Cl.³ .......................... B29C 1/00; F26B 25/18
[52] U.S. Cl. ........................................ 249/134; 34/237
[58] Field of Search .......................... 229/2.5; 249/134

[56] References Cited

U.S. PATENT DOCUMENTS 1,668,101  5/1928  Bothe .................................... 229/2.5
2,629,533  2/1953  Chaplin .................................. 229/2.5

Primary Examiner—J. Howard Flint, Jr.
Attorney, Agent, or Firm—Rummler & Snow

[57] ABSTRACT

A replaceable individual proofing cup for use in proofing English muffin doughballs and comprising a flanged, flat-bottomed, cylindrical receptacle formed of porous, interlocked-fiber wool felt and having minimum draft in its sidewalls giving good doughball release characteristics for depositing proofed doughballs into grilling cups of a conventional traveling English muffin griddle and minimum lay in its bottom so as not to restrict lateral growth of the doughballs when proofing.

3 Claims, 5 Drawing Figures

U.S. Patent    Jun. 15, 1982    4,334,665
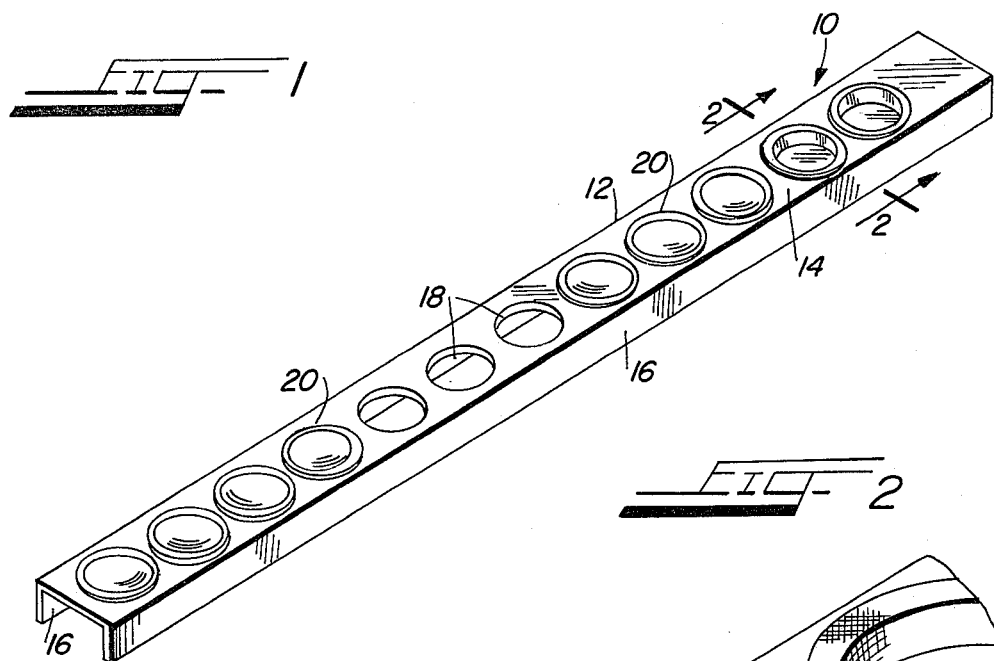
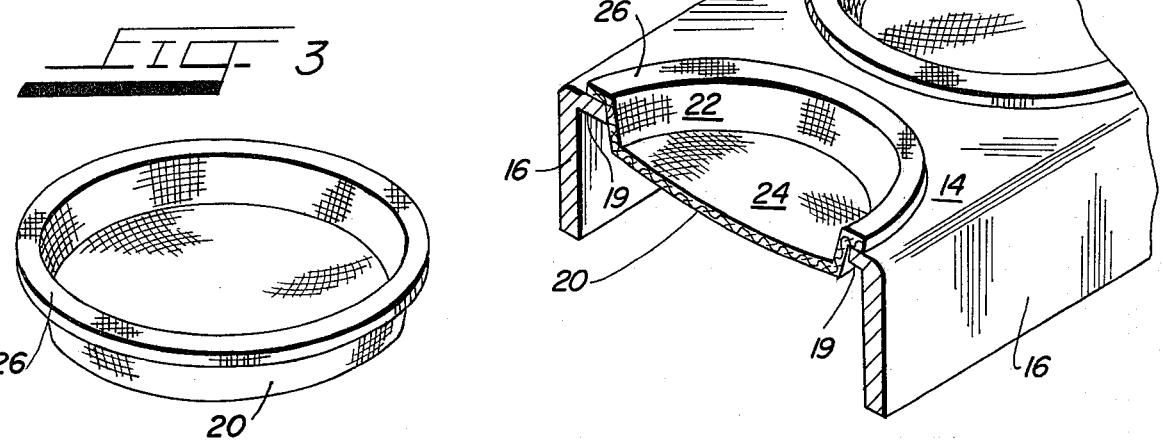
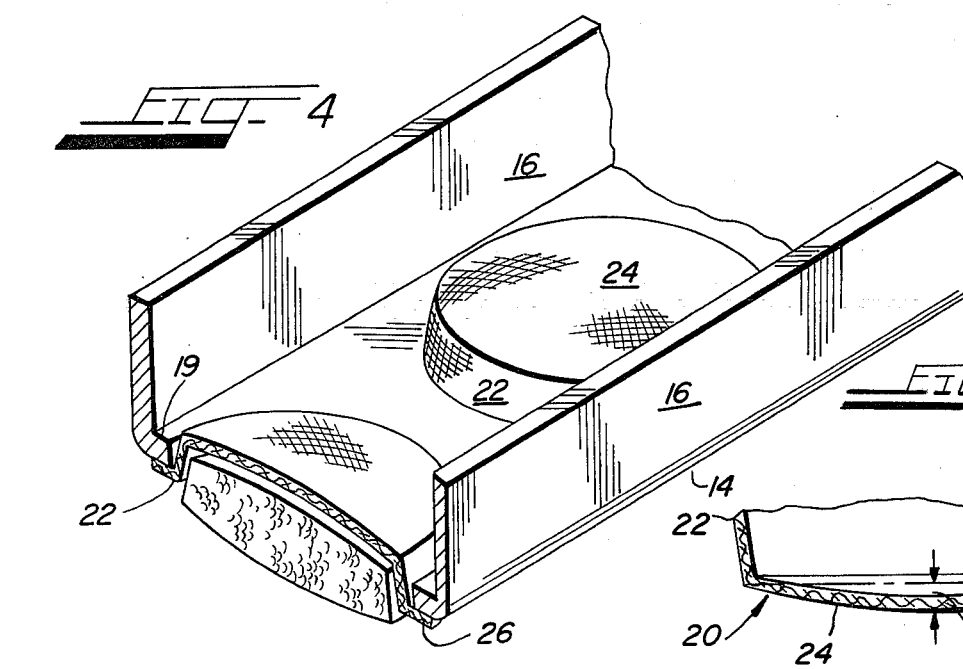
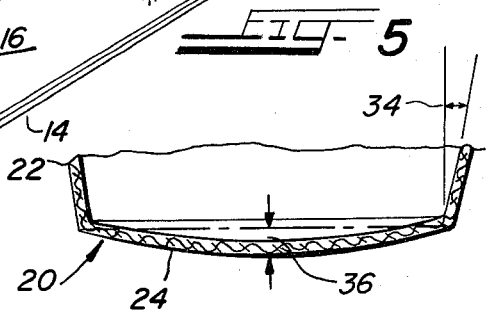

REPLACEABLE CUP FOR ENGLISH MUFFIN PROOFING TRAYS

BACKGROUND OF THE INVENTION

In the process of bringing dough to a standard lightness in its preparation for the grilling of English muffins, it is important to expose the dough to air having a given moisture content and dry bulb temperature for a certain period of time in order to bring a uniform standard of unrestricted expansion, texture and shape for the muffin dough. The emphasis here is on the word unrestricted, particularly with respect to texture and shape, because with conventional proofing means the doughballs expand irregularly and thus lack the air cell size and distribution to provide the open internal texture and uniform shape so desired in the fully grilled muffin.

In the operation of high-speed industrial muffin griddles and the automated feeding of proofed doughballs thereto, the dump of the doughballs from the proofing trays also must be predictable during the duty cycle. In practice, it is thus essential that the freshly proofed doughballs not adhere to the proofing cups in the tray when they are upended. Doughballs should drop freely from the inverted proofing cup to the waiting griddle cup below in a consistent and predictable manner. If a doughball does not release rapidly and holds back at all, it pulls the dough and the stuck portion causes a rupture of the doughball allowing the proofing gases generated during the proof cycle to escape. The result is a smaller and "blind" muffin with no holes. A commercially unacceptable product.

Also, from a gourmet's point of view, cavities for proofing of dough in prior proofing devices are rounded-bottom shape permitting uneven expansion of the dough during proofing and also inhibiting the uniform growth of gas bubbles in the "rising" of the dough mass. In order to attain maximum control over the doughpiece in proofing, it should be allowed to proof laterally and not be restricted by a concave bottom in the proofing cup. This also causes larger holes which are extremely desirable in English muffins.

Furthermore, in prior proofing devices the proofing trays are covered with an open weave sleeve which extends the length of the tray which is generally of size to provide twelve doughballs pockets. Thus, when a tear develops in one or more pockets during use, the entire sleeve must be replaced, which is costly and wasteful. With the present invention, the proofing cups are individually replaceable, as may be needed, with a material cost saving.

SUMMARY OF THE INVENTION

The gist of this invention lies in a replaceable, minimum-draft, flat-bottomed cup formed of felt comprising a minimum of 95% wool, a maximum of $2\frac{1}{4}$% trichloroethane extractable materials, a maximum of $1\frac{1}{2}$% ash content and a tensile strength of 500 psi for proofing English muffin doughballs, the cup having a cavity diameter of a size to provide a proofed doughball that will substantially fill a conventional English muffin griddle grilling cup, and a sidewall draft and lay of the bottom that will readily release the proofed doughball upon inversion, the proofing cup also having a peripheral open-end flange that is cementable to the margins of the circular apertures in the web of a conventional proofing tray such as that disclosed in my U.S. Pat. No. 3,807,057.

DESCRIPTION OF THE DRAWINGS

FIG. 1 shows a perspective view of a conventional, partially loaded proofing tray showing several unproofed doughballs and including the disposable proofing cups of this invention mounted in the tray apertures;

FIG. 2 shows a fragmentary perspective view taken along line 2—2 of FIG. 1;

FIG. 3 shows a perspective view of a replacement proofer cup;

FIG. 4 shows the unloading of a doughball from a proofer cup during inversion of the proofer tray; and FIG. 5 shows the taper on the sidewall and the lay of the bottom of the cup.

DESCRIPTION OF THE PREFERRED EMBODIMENT

Referring to FIG. 1, a standard twelve-cavity proofer tray assembly 10 comprises a one-piece channel frame 12 having a rectangular top web 14 and two legs 16 depending from the longitudinal edges thereof formed from aluminum sheet. Twelve circular apertures 18 are linearly arranged in equally spaced relation along the length of web 14. As shown in FIG. 1, a cavity cup 20 of woolen felt material is inserted in each of the twelve apertures 18 of the tray assembly 10. Cups 20, as shown in FIG. 2, have a peripheral flange 26 projecting from the top of a cylindrical sidewall 22 which minimally tapers down in sealed relation to a circular flat-bottomed disk 24 of the same material having at most a lay not exceeding 1/32 inch per inch of cup diameter and a diameter pretty near the same as the top in order not to laterally restrict the doughpiece during proofing. The wide flange 26 around the top of the cup 20 is bottom-glued by waterglass to the top side of the margin 19 around the aperture 18 in the web 14.

Referring to FIG. 3 cup 20 is formed from a one-piece circular blank (not shown) of about 1/16 inch thick felt sheet having a minimum of 95% wool, a maximum of $2\frac{1}{4}$% trichloroethane extractable materials, a maximum of $1\frac{1}{2}$% ash content and a tensile strength of 500 psi. The felt sheet weighs between 0.94 and 1.01 lbs. per square yard.

Referring to FIG. 5, draft 34 in the sidewall 22 of cup 20 tapers radially inward from the top down not to exceed 2 inches per foot of cup height. The lay 36 of the bottom disk 24 is measured with respect to the bottom of cup 20 not to exceed 1/32 inch per inch of cup diameter.

The operation of the doughball proofer tray assembly 10 of this invention is demonstrated in FIG. 4 wherein standard twelve-cup trays 10 are unloaded by upending.

The wool felt material in combination with the minimum draft 34 in the sidewall 22 and the flat lay 36 of the bottom 24 of the cup 20 gives very good unloading and proofing characteristics. The tray 10 does not restrict the circulation of air to the cups 20 as it flows upwardly therethrough, as shown in FIG. 2.

Although but one specific embodiment of this invention is herein shown and described, it will be understood that details of the construction shown may be altered or omitted without departing from the spirit of the invention as defined by the following claims.

I claim:

1. A proofing cup formed of felt sheeting approximately 1/16 inch thick having a minimum of 95% wool, a maximum of 2¼% trichloroethane extractable materials, and a tensile strength of at least 500 psi, said cup having a substantially flat bottom and sidewalls tapering inwardly with a minimum draft.

2. A proofing cup as set forth in claim 1 wherein the draft comprises a taper measured with respect to the sidewall indicated not exceeding 2 inches per foot of cup height.

3. A proofing cup as set forth in claim 1 wherein the bottom comprises said material having an approximate lay measured with respect to the bottom not exceeding 1/32 inch per inch cup diameter.

* * * * *